(12) United States Patent
Totten et al.

(10) Patent No.: US 10,024,191 B2
(45) Date of Patent: Jul. 17, 2018

(54) FAN TRACK LINER DESIGNED TO YIELD NEXT TO FAN CASE HOOK

(71) Applicant: Rolls-Royce Corporation, Indianapolis, IN (US)

(72) Inventors: Trevor John Totten, Avon, IN (US); Jonathan Michael Rivers, Indianapolis, IN (US); Eric William Engebretsen, Zionsville, IN (US); Matthew Joseph Kappes, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 643 days.

(21) Appl. No.: 14/019,272

(22) Filed: Sep. 5, 2013

(65) Prior Publication Data

US 2014/0255152 A1    Sep. 11, 2014

Related U.S. Application Data

(60) Provisional application No. 61/776,645, filed on Mar. 11, 2013.

(51) Int. Cl.
| | |
|---|---|
| *F01D 25/24* | (2006.01) |
| *F01D 21/04* | (2006.01) |
| *F01D 11/12* | (2006.01) |
| *F02K 3/06* | (2006.01) |

(52) U.S. Cl.
CPC .......... *F01D 25/24* (2013.01); *F01D 21/045* (2013.01); *F01D 11/122* (2013.01); *F02K 3/06* (2013.01); *F05D 2220/36* (2013.01); *F05D 2250/283* (2013.01); *F05D 2300/702* (2013.01); *Y02T 50/672* (2013.01)

(58) Field of Classification Search
CPC ...... F01D 25/24; F01D 25/243; F01D 21/045; F01D 25/164; F02K 3/06; F05D 2250/283
See application file for complete search history.

(56) References Cited

U.S. PATENT DOCUMENTS

| | | | |
|---|---|---|---|
| 4,500,252 A | 2/1985 | Monhardt et al. | |
| 5,267,828 A | 12/1993 | Lenhart et al. | |
| 5,336,044 A | 8/1994 | Forrester | |
| 5,409,349 A | 4/1995 | Kulak et al. | |

(Continued)

FOREIGN PATENT DOCUMENTS

| | | |
|---|---|---|
| EP | 1860283 A2 | 11/2007 |
| EP | 2290196 A2 | 3/2011 |

(Continued)

OTHER PUBLICATIONS

International Search Report for PCT/US2013/066332 dated Feb. 27, 2014.

*Primary Examiner* — Woody Lee, Jr.
*Assistant Examiner* — Maxime Adjagbe
(74) *Attorney, Agent, or Firm* — Fishman Stewart PLLC

(57) ABSTRACT

A containment system for a gas turbine engine includes a fan track assembly for use with a containment case. The fan track assembly includes a body of collapsible material that is positioned within a cavity of the fan case, and voids are provided for providing space in the event of a catastrophic blade failure. Various configurations of the fan track liner assembly are provided along with various mounting methodologies for securing the track liner assembly to the fan case of a gas turbine engine.

20 Claims, 3 Drawing Sheets

(56) References Cited

U.S. PATENT DOCUMENTS

| | | | |
|---|---|---|---|
| 5,516,257 A | 5/1996 | Kasprow et al. | |
| 5,823,739 A | 10/1998 | Van Duyn | |
| 6,206,631 B1 | 3/2001 | Schilling | |
| 6,290,455 B1 * | 9/2001 | Hemmelgarn | F01D 21/045 415/173.4 |
| 6,364,603 B1 | 4/2002 | Czachor et al. | |
| 6,468,026 B1 | 10/2002 | Bonnoitt et al. | |
| 7,402,022 B2 * | 7/2008 | Harper | F01D 21/045 415/214.1 |
| 7,866,939 B2 * | 1/2011 | Harper | B64D 33/02 415/119 |
| 8,061,967 B2 | 11/2011 | Marlin et al. | |
| 2008/0232951 A1 | 9/2008 | Cardarella | |
| 2010/0028130 A1 * | 2/2010 | Reed | F01D 21/045 415/9 |
| 2011/0044806 A1 * | 2/2011 | Harper | F01D 21/045 415/182.1 |
| 2011/0211943 A1 | 9/2011 | Belbeck et al. | |
| 2011/0232833 A1 * | 9/2011 | Collins | F01D 11/127 156/165 |
| 2012/0134774 A1 * | 5/2012 | Clark | B65D 43/0222 415/9 |

FOREIGN PATENT DOCUMENTS

| | | | |
|---|---|---|---|
| EP | 2290199 | A2 | 3/2011 |
| EP | 2495400 | A2 | 9/2012 |
| GB | 2407344 | A | 4/2005 |

* cited by examiner

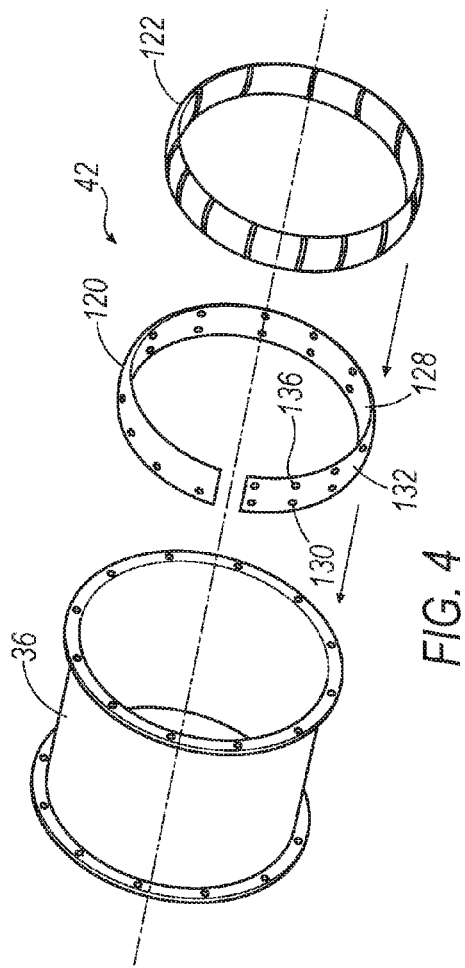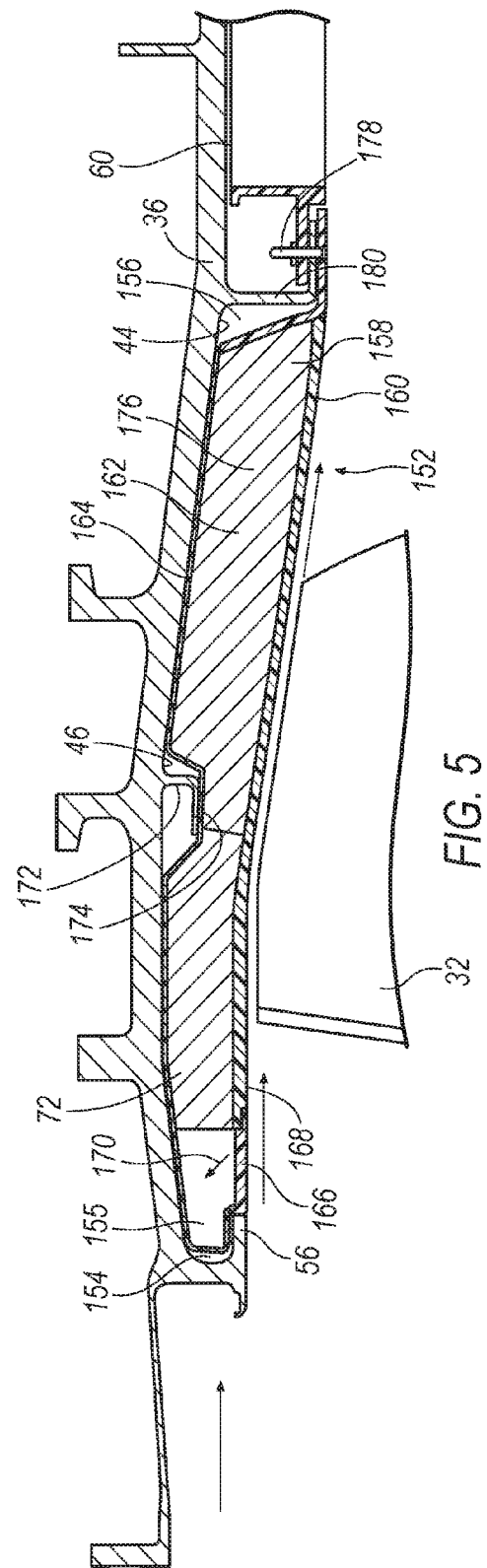

FAN TRACK LINER DESIGNED TO YIELD NEXT TO FAN CASE HOOK

CROSS-REFERENCE TO RELATED APPLICATIONS

This application claims priority to U.S. Provisional Patent Application No. 61/776,645, filed Mar. 11, 2013, the contents of which are hereby incorporated in their entirety.

FIELD OF TECHNOLOGY

An improved liner for a fan case for a gas turbine engine, and more particularly, an improved fan track liner and method of mounting the liner to the fan case of a gas turbine engine.

BACKGROUND

Gas turbine engines are used extensively in high performance aircraft and they employ large fans that are positioned at the front of the engine so as to provide greater thrust and to reduce specific fuel consumption. This in turn, provides greater efficiencies and economical performance which is desired in the competitive airline industry. A fan is disposed within a duct and is driven by a shaft that is connected to the turbine and directs air rearwardly through the duct in the form of bypass air. The duct includes a fan casing that circumscribes the fan and the casing is capable of containing debris and minimizing damage to the engine in the event a catastrophic event occurs such as when birds, hailstones, or other debris enter the duct.

Fan casings can also be equipped with specialized blade containment structures that serve to minimize structural damage to the immediate surroundings of the engine in the event a fan blade is released from its hub during engine operation. This is known as a "blade-off" event, which can be catastrophic to an aircraft. Thus, various configurations have been used for such containment structures including various methods of securing the containment structure to a fan casing.

Serviceability of the fan casing has also become a problem in the event a containment structure has been damaged and needs replaced. For example, if debris were to enter a fan casing, and the integrity of an existing containment structure is diminished, then maintenance workers must service the aircraft by taking the aircraft out of service. Once the aircraft is taken out of service, a repair technician then removes the damaged containment structure and then installs a compatible replacement containment structure. These structures are sometimes referred to as a fan track liner.

Traditionally, containment structures would be glued to the interior surface of the fan casing which, when in need of repair, would require a worker to spend substantial resources in removing the old containment structure. For example, the interior surface of the fan case would need to be reconditioned before installing a new containment structure. Sometimes the containment structures have been known to utilize a bonding agent to affix the structure to the fan case track. Such instances require the entire fan casing to be placed within a large oven in order to cure the bonding agent so as to assure proper adhesive of the containment structure to the fan casing. Fan casings reach up to ten feet in diameter, which means large expensive ovens must be used to complete the bonding agent curing process.

Another problem with utilizing traditional containment structures is that they fail to provide a sufficient containment of debris during a blade-off or other catastrophic event. This may be due to the containment structure being too rigid and not demonstrating the proper collapsible deformation characteristics that may be present during predetermined conditions. For example, it would not be desirable to have a fan track liner collapse due to ice impact. By contrast, having a liner that collapses during a blade-off, or other events, so as to minimize damage to the engine and its surroundings, could be helpful to the industry. It may also be helpful to provide a containment structure that has a predetermined collapsing characteristic or profile.

An exemplary embodiment may overcome these problems and provide a containment structure that more fully meets the demands of today's aircraft industry.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 4 illustrates an exploded perspective view of the fan track liner assembly illustrated in FIG. 3; showing a liner, a backing tray and a fan casing; and FIG. 5 illustrates a side-elevational sectional view of an alternative fan track liner assembly, shown installed to a fan case.

DETAILED DESCRIPTION

Exemplary illustrations of a gas turbine engine having a containment structure such as fan track liner assembly are described herein and are shown in the attached drawings. Exemplary fan track liner assemblies may include a one-piece removal tray that is positioned within a cavity of the fan case. The tray may be secured at a forward edge of the fan case cavity by either resting on, or being fastened to a fan case hook. The aft position of the tray may be positioned in place and held securely by a fastener.

Another example of a containment structure may include a fan track liner assembly and method of installation including first inserting a backing tray within the cavity of a fan case. A liner may then be bonded to the backing tray so as to form a fan track liner assembly. A void may be provided in the fan case cavity, that is positioned forward of the collapsible components of the liner, so as to provide an area for debris to collect, in the event of a blade-off, or other catastrophic event. Other aspects of the disclosure will become apparent and is set forth below.

Figure 1:
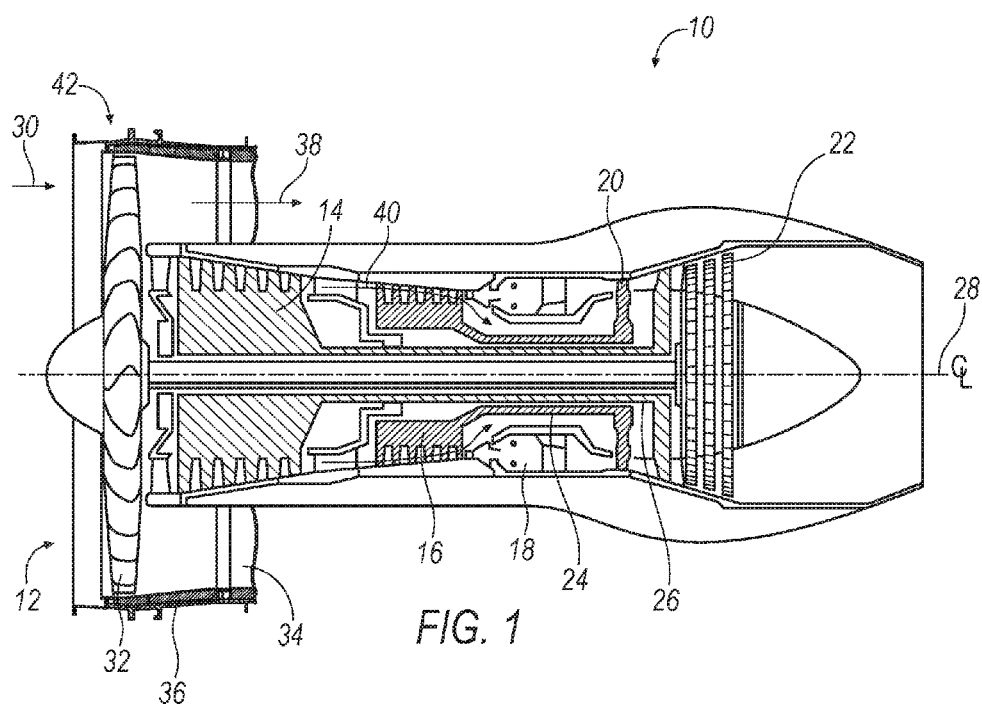
FIG. 1 illustrates a schematic view of a gas turbine engine employing the improvements discussed herein.

Turning now to the drawings, FIG. 1 illustrates a gas turbine machine 10 for use in connection with a high performance aircraft. The machine 10 includes a fan 12, a low pressure compressor and a high pressure compressor, 14 and 16, a combustor 18, and high pressure turbine and low pressure turbine, 20 and 22, respectively. The high pressure compressor 16 is connected to a first rotor shaft 24 and the low pressure compressor 14 is connected to a second rotor shaft 26. The shafts extend axially and are parallel to a longitudinal center line axis 28.

Ambient air 30 enters the fan 12 and is directed across a fan rotor 32 and into an annular duct 34 which in part is circumscribed by fan case 36. The bypass airflow 38 provides engine thrust while the primary gas stream 40 is directed to the combustor 18 and the high pressure turbine 20. The fan case 36 includes an improved fan track liner assembly 42, which can enhance containment of debris during predetermined events.

Figure 2:
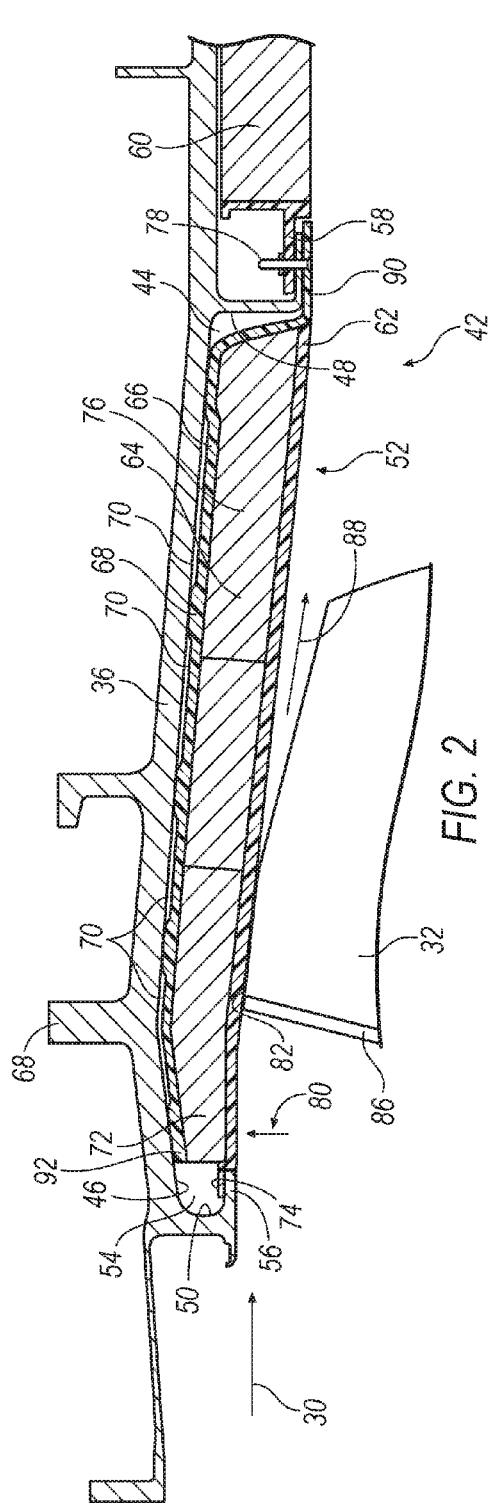
FIG. 2 illustrates a side-elevational sectional view of a fan track liner assembly that is designed to yield next to a fan case hook.

With reference to FIG. 2, a fan track liner assembly 42 is positioned within the fan track cavity 44. The fan track cavity 44 is a radially extending recess that is encompassed by a fan case inner surface 46, an aft located radially extended wall 48, a forwardly positioned accurate shaped wall 50, and an opening 52 that extends between the radially extending wall 48 and the wall 50. The cavity 44 has a depth similar to the length of the radially extending wall 48 and the cavity 44 is substantially consumed by the volume defined by the external configuration of the fan track liner assembly 42. A void 54 is provided near the fan case hook 56, which provides a space for fragments of the blade 32, or other debris, to enter during a catastrophic event. The void 54 further provides a space for the fan track liner assembly 42 to be collapsed partially into during a catastrophic event. The fan case 36 further includes a support member 58 extending from the wall 48, and the support member 58 provides a mounting surface to which the fan track liner assembly 42 can be mounted at its rearward location. Another liner assembly 60 can be mounted to the same support member 58, if so desired.

The fan track liner assembly 42 is operable to yield next to the fan case hook 56 during a catastrophic event. The components of the fan track liner assembly 42 include an outer surface 62, a honeycomb core 64, and a liner 66 which lies adjacent the fan case inner surface 46. The liner 66 includes a plurality of raised surfaces 68, which appear like bumps along the surface of the liner 66. The raised surfaces 68 impinge upon the fan case inner surface 46 and provide voids 70 throughout the area in which the liner 66 engages the fan case inner surface 46. The voids 70 operate to remove material from the liner 66 so as to make the fan track liner assembly 42 lighter. The voids 70 further provide spaces or vacancies, which in turn, during a catastrophic event, allow the core 64 to be collapsed into the voids 70. It will be appreciated that the voids 70 may provide other features and benefits as well.

The outer surface 62 of the fan track liner 42 can be made of an abradable material such as, but not limited to, NOMEX® brand honeycomb filled with epoxy filled low density filler. The core 64 has a honeycomb like structure. It will be appreciated that the core 64 may be made of other materials, and provide various collapsing characteristics, as is desired by the industry. The liner 66 performs a tray-like function, thus allowing the fan track liner assembly 42 to set within the fan track cavity 44, relatively easily during repair conditions. In this instance, no adhesive is used to secure the assembly 42 to the fan case 36, thus enhancing serviceability. The liner 66 can be made of a composite material, but it will be appreciated that it could be made of other materials.

To install the fan track liner assembly 42, the forward section 72 of the fan track liner assembly 42 is inserted such that a lip 74 is inserted radially outward of the fan case hook 56, while the aft section 76 is rotated outward and bolted via fastener 78 to support member 58. The lip 74 is on the leading edge of the outer surface 62. The lip 74 rests upon the fan case hook 56 and it is not rigidly secured thereto. Thus, the lip 74 is operable to be displaced in the direction of arrow 80 during a catastrophic event. During such period, the lip 74 moves into the void 54 and provides a space for debris to accumulate. The fan blade 32 is shown with its tip 82 in contact with the outer surface 62. Such condition could occur when the gas turbine 10 is under load during normal operating conditions. The fan track liner assembly 42 has a predetermined level of deflectability so as to allow it to perform under such conditions. An aerodynamic flow path 30 is directed to a leading edge 86 of the blade 32, which in turn generates a fan blade airflow 88, which in turn becomes bypass airflow 38 (FIG. 1). During a blade-off catastrophic event, blade debris could move forward, thus causing lip 74 to move in the direction of arrow 80. Under this condition, blade debris could be captured in the void 54, and or the core 64 could deform and move into void 54. The fan hook 56 and void 54 aid in capturing debris during catastrophic events.

An aft section 76 of the fan track liner assembly 42 is shown rigidly secured by the fastener 78, which extends through a lip 90 that is a component of the liner 66. It will be appreciated that other fastening type devices 78 may be employed, utilizing other mechanical configurations. When the fan track liner assembly 42 is loaded within the fan track cavity 44, the assembly 42 is slightly compressed in the forward and radial directions, thus making it pre-loaded as the installer secures fasteners 78 in place. By the fan track liner assembly 42 being slightly preloaded, pressure is maintained on lip 74 at or near the fan case hook 56. The nose 92 of the fan track liner 42 similarly is wedged against the fan case inner surface 46, which in turn causes the forward section 72 to be wedged in place, and firmly secured in the cavity 44.

Figure 3:
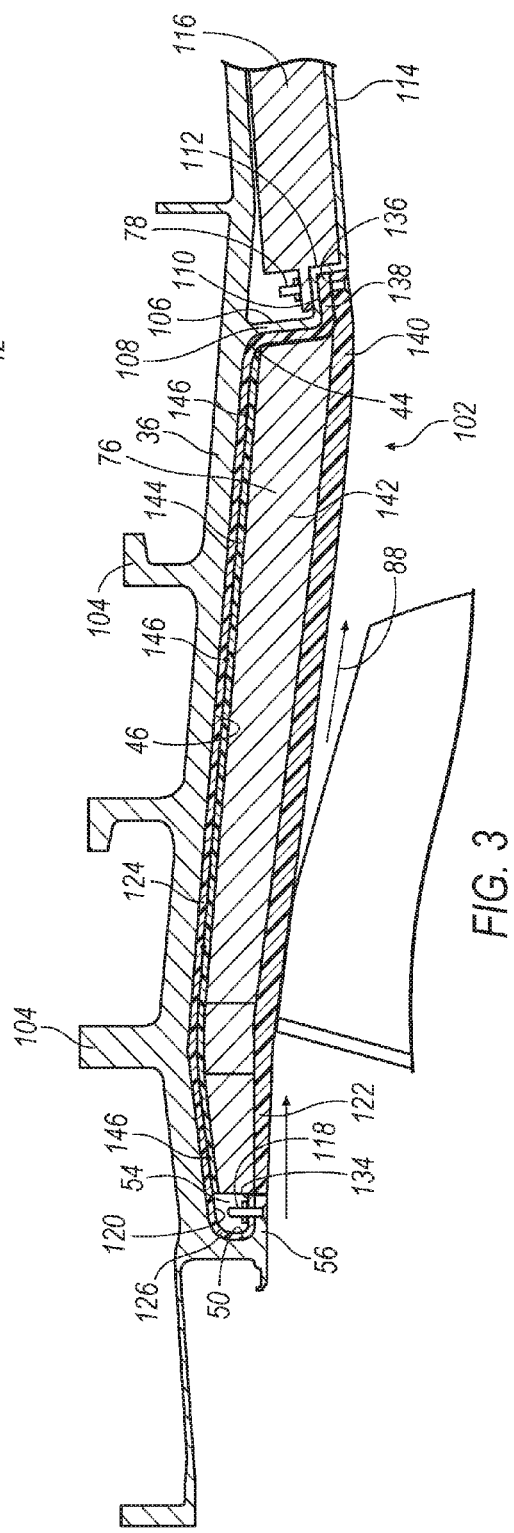
FIG. 3 illustrates a side-elevational sectional view of an alternative fan track liner assembly, shown installed to a fan casing.

With reference now to FIG. 3, an alternative fan track liner assembly 102 is provided. Where possible, like reference numerals have been utilized. The fan case 36 includes an inner surface 46, reinforcement ribs 104, and a cavity 44. An arcuate shaped wall 50 encompasses a forward section of the cavity 44, and L-shaped wall 106 defines an aft portion of the cavity 44. The wall 106 includes a radially extending member 108, an axially extending wall 110 and another radially extending wall 112 that connects with another axially extending wall 114. Another track liner assembly 116 is adjacent thereto and is secured in place by fastener 78. Another fastener 118 is used at the forward end of the fan track liner assembly 102, for securing the assembly to the fan hook 56.

The fan track liner assembly 102 is a two-piece assembly that is secured to the fan case 36. The assembly 102 includes a backing tray 120 and a liner 122. The backing tray 120 can be made of composite material and has a surface configuration that matches substantially the fan case inner surface profile 124. The backing tray 120 is sufficiently flexible to allow its resilient hooked shaped portion 126 to be securely fitted to wall 50.

With reference to the exploded view FIG. 4, the fan track liner assembly 42 includes the backing tray 120 with a split-ring configuration 128 that can be made of a single-piece composite, nylon, or other similar type material. The backing tray 120 has apertures 130 about its periphery 132 near the forward section of the tray 120. These apertures 130 are for receiving the fasteners 118 that secure the lip 134 of the backing tray 120 to the hook 56 of the fan case 36. The apertures 130 are spaced at a plurality of locations around its periphery 132. Similarly, apertures 136 are spaced around the periphery 132 of the split ring 128 near the aft portion 138 of the backing tray 120. The apertures 136 appear in the wall 110 of the backing tray 120 and have sufficient clearance to receive the fasteners 78. With reference to FIGS. 3 and 4, the liner 122 is circular-shaped and is configured to be radially inset and located within the backing tray 120. The liner 122 includes an outer surface 140 (made of an abradable material), a honeycomb core 142 and a skin 144 that extends axially adjacent to the backing tray 120. An adhesive bond layer 146 is sandwiched between the backing tray 120 and the skin 144 to firmly secure the liner 122 to the backing tray 120. It will be appreciated that various types of chemical methods may be employed in order to form the appropriate bond layer 146. The skin 144 may be constructed of composite material, but it will be appreciated that other materials can be utilized.

To install the fan track liner assembly 102 to the fan case 36, first the technician positions the backing tray 120 within the cavity 44 of the fan case 36. The hook-shaped portion 126 of the backing tray 120 is bolted 118 to the fan case hook 56. The aft portion 76 of the backing tray 120 can now be pushed into position. The adhesive bond layer 146 can now be applied to the backing tray 120 and the liner 122 can now be inserted and bonded to the tray 120. Fastener 78 can now be installed which now firmly locks the fan track liner assembly 102 to the fan case 36.

With reference now to FIG. 5, another alternative fan track liner assembly 152 is disclosed and is secured in position to a fan case 36. Where possible, like reference numerals will be provided. A cavity 44 has received therein the fan track assembly 152, which employs a substantial volume of the cavity 44, but for void 154 and void 156. Another void 155 is circumscribed by the skin 164 of the assembly 152. The voids provide empty space for the fan track assembly 152 to collapse within, along with debris, during a catastrophic event. It will be appreciated that voids having other spaces, within cavity 44, can be provided, depending upon the geometric configuration of the provide fan track assembly 152.

The fan track assembly 152 includes a one-piece tray 158 that includes an outer abradable surface 160, a honeycomb core 162 and a skin 164. The skin 164 is configured to be positioned closely to the fan case inner surface 46. The fan track assembly 152 further includes a flexible strip 166, made of pliable material, near a forward position 168, and the strip 166 is connected to the forward position via adhesive, or other similar type methodologies. The flexible strip 166 represents an area of the fan track assembly 152 that has reduced strength as it can be easily collapsed during a pre-determined event. For example, during a catastrophic event, the strip 166 may move in the direction of arrow 170, thus creating an opening and access to void 155, and allowing debris to enter. It will be appreciated that the strip 166 could be bolted to the fan case hook 56 (not shown) in lieu of being connected to the forward position 168 of the outer surface 160. Likewise, the fan casing 36 is provided with a support member 172 that could include a fastener (not shown) for securing a recessed portion 174 within the core 162. The aft section 176 of the fan track assembly 152 is secured via fastener 178 to the fan case bracketry 180.

The reduction in strength of the tray 158 in the section with the rubber strip 166 compared to the previously discussed abradable liner 122, allows the blade 32 to penetrate the tray 158 more easily, thereby engaging the fan case hook 56 in a more consistent manner. Further, the reduction in strength in the area near the void 155 also aids in blade-to-hook engagement. It will be appreciated that the axial-length of the void 155 can be sized to meet other needs of the containment system, which could be based on the blade 32 and tray 158 characteristics. The edges of the strip 166 can be sealed with epoxy, polysulfide, or the equivalent adhesive/caulk if desired.

It will be appreciated that the fan track assembly 152 could include other geometric configurations, so as to modify the volume of spacing found in voids 155 and 156. Likewise, materials other than the strip 166 can be employed so as to provide a weakened structure near the forward section 72 of the tray 158, so as to allow the liner to yield next to the fan case hook. Further, the liner assemblies 42, 102 and 152 may include inner core sections having different crush strengths. For example, the forward section 72 may have a crush strength measuring one metric, while the aft section 176 may have a crush strength measuring another metric. Thus, a single liner assembly may operate differently from front to aft given a certain catastrophic condition.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A fan track liner assembly for use with a fan containment case for a gas turbine engine comprising:
a fan track body extending axially from a forward section to an aft section, the fan track body including a first surface, an inner core and a second surface, the first surface is made of abradable material and is operable to engage a blade member, the inner core disposed radially between the first surface and the second surface and is made of collapsible material that is operable to be deformed during a catastrophic condition, the second surface disposed radially outwards from the first surface;
a first mounting member extending from the forward section of the fan track body for engaging a fan case hook; and
a second mounting member extending from the aft section of the fan track body;
a tray disposed between an inside surface of a cavity of a fan case and the fan track body, the fan track body being arranged in the tray;
wherein the first surface and the second surface extend axially along the inner core and provides a vacancy in a radial direction along a forward face of the inner core to facilitate deformation of the forward section of the fan track body into a void disposed in an area between the fan track body and the inside surface of the fan case during the catastrophic condition; and wherein the tray includes a hook-shaped portion extending axially outward from the forward section of the fan track body along the inside surface of the fan case and radially inwards to circumscribe the void, the hook-shaped portion defining the first mounting member, the hook-shaped portion having a lip extending in an axially downstream direction structured and arranged to engage the fan case hook and end forward of an aft side of the fan case hook.

2. The fan track liner assembly as claimed in claim 1, wherein the forward section defines an axial face disposed adjacent to the void and aft of the fan case hook.

3. The fan track liner assembly as claimed in claim 1, wherein the tray has a plurality of apertures distributed circumferentially along the hook-shaped portion for receiving fasteners that secure the hook-shaped portion to the fan case hook.

4. The fan track liner assembly as claimed in claim 1, wherein the second surface of the fan track body includes a skin adhesively bonded to the tray.

5. The fan track liner assembly as claimed in claim 1, wherein the inner core is made of a honey-comb material that is filled with epoxy.

6. The fan track liner assembly as claimed in claim 1, wherein the fan track body is a single-piece split ring shaped configuration.

7. A fan track liner assembly for a gas turbine engine comprising:
a fan containment case, the fan containment case including a fan case hook, a cavity, and a mounting member;
a fan track liner configured to fit substantially within the cavity of the fan containment case, the fan track liner having a forward section and an aft section, wherein the fan track liner includes a first layer of abradable material, a radially outer second layer, and an inner core disposed between the first layer and the second layer;
the forward section configured to interact with the fan case hook to provide a void disposed in the cavity near the fan case hook at an axial face of the forward section of the fan track liner; and
an axially extending lip disposed at the forward section and coupled to a forward edge of the first layer, wherein the axially extending lip protrudes axially from the forward section and engages onto a radially outer side of the fan case hook; and
wherein the first layer and the second layer extend axially along the inner core and the axial face of the forward section is disposed aft of the void to facilitate deformation of the fan track liner near the fan case hook during a catastrophic event.

8. The fan track liner assembly as claimed in claim 7, wherein the fan track liner is preloaded in a forward and radial direction against an inside surface of the fan containment case.

9. The fan track liner assembly as claimed in claim 7, wherein the axially extending lip rests on the radially outer side of the fan case hook, and the second layer defines a nose in the forward section arranged at a position disposed radially outwards of the inner core.

10. The fan track liner assembly as claimed in claim 7, wherein the fan track liner forms a 360 degree circle, and has a split portion.

11. The fan track liner assembly as claimed in claim 7, wherein the second layer includes a plurality of raised surfaces impinging against an inside surface of the fan containment case.

12. The fan track liner assembly as claimed in claim 7, wherein the fan containment case further includes an axially forward radially extending wall and the fan case hook extends axially from the radially extending wall, and wherein the axially extending lip is disposed radially outwards of the fan case hook and axially overlaps the radially outer side to provide a radial interference between the fan track liner and the fan containment case.

13. The fan track liner assembly as claimed in claim 7, wherein the second layer includes an aft mounting portion fastened to the mounting member of the fan containment case.

14. The fan track liner assembly as claimed in claim 9, wherein the nose of the second layer is wedged against an inside surface of the fan containment case such that the forward section is wedged in place by the axially extending lip and the nose.

15. The fan track liner assembly as claimed in claim 14, wherein the nose protrudes radially from the second layer.

16. A fan track liner assembly for a gas turbine engine having a longitudinal axis, comprising:
a fan case defining a cavity disposed axially between a forward radially extended wall and an aft radially extended wall, the fan case including a fan case hook protruding axially from the forward radially extended wall;
a fan track liner received in the cavity and having a forward section configured to interact with the forward radially extended wall and an aft section configured to interact with the aft radially extended wall, the fan track liner including a first layer of abradable material, a radially outer second layer, and an inner core disposed radially between the first layer and the second layer;
the forward section of the fan track liner having a forward axial face spaced away from the fan case hook in an axially aft direction to provide a void aft of the fan case hook; and
an axially extending strip of material disposed at the forward section in a gap defined axially between the forward axial face and the fan case hook, wherein the axially extending strip extends from the first layer and bridges the gap between the forward axial face and the fan case hook radially inwards of the void to provide an aerodynamic flow path with a reduced strength.

17. The fan track liner assembly as claimed in claim 16, wherein the axially extending strip is secured to a forward edge of the first layer and is mounted on an aft end of the fan case hook.

18. The fan track liner assembly as claimed in claim 16, wherein the second layer includes a hook-shaped portion extending axially outward from the forward axial face of the forward section along the cavity and towards the forward radially extended wall to circumscribe the void, and wherein the hook-shaped portion is mounted on a radially outer surface of the fan case hook.

19. The fan track liner assembly as claimed in claim 16, wherein the axially extending strip is composed of a pliable material.

20. The fan track liner assembly as claimed in claim 16, wherein the fan case includes a support member extending radially into the cavity disposed between the aft radially extended wall and the forward radially extended wall, and wherein the fan track liner has a recessed portion disposed between the forward section and the aft section secured to the support member.

* * * * *